United States Patent
Deng

(10) Patent No.: US 9,055,442 B2
(45) Date of Patent: Jun. 9, 2015

(54) METHOD AND SYSTEM FOR REALIZING INTEGRITY PROTECTION

(75) Inventor: Yun Deng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 311 days.

(21) Appl. No.: 13/577,430

(22) PCT Filed: Apr. 22, 2011

(86) PCT No.: PCT/CN2011/073188
§ 371 (c)(1),
(2), (4) Date: Aug. 6, 2012

(87) PCT Pub. No.: WO2012/071845
PCT Pub. Date: Jun. 7, 2012

(65) Prior Publication Data
US 2012/0315878 A1    Dec. 13, 2012

(30) Foreign Application Priority Data
Dec. 1, 2010    (CN) .......................... 2010 1 0569422

(51) Int. Cl.
*H04M 1/66*    (2006.01)
*H04W 36/00*    (2009.01)
(Continued)

(52) U.S. Cl.
CPC ............ *H04W 12/10* (2013.01); *H04W 76/028* (2013.01); *H04W 84/047* (2013.01)

(58) Field of Classification Search
CPC ....................................................... H04M 1/66
USPC .............. 455/507, 436, 7, 411, 525; 370/315, 370/329, 312, 328, 252
See application file for complete search history.

(56) References Cited

U.S. PATENT DOCUMENTS

2009/0316664 A1    12/2009    Wu
2011/0092236 A1*    4/2011    Iwamura et al. .............. 455/507
(Continued)

FOREIGN PATENT DOCUMENTS

CN    101068436 A    11/2007
CN    101702818 A    5/2010
(Continued)

OTHER PUBLICATIONS

Nokia Siemens Networks et al: "RRC Impact due to S1/X2 IP", 3GPP Draft; R2-106230 (RN Security-RRC), 3rd Generation Partnership Project (3GPP), Mobile Competence Centre; 650, Route Des Lucioles; F-06921 Sophia-Antipolis Cedex; France, vol. RAN WG2, No. 72, Jacksonville, USA; Nov. 9, 2010. (14 pages—see Supplementary European Search Report in European application No. 11844484.3 for relevant pages).

(Continued)

*Primary Examiner* — Kiet Doan
(74) *Attorney, Agent, or Firm* — Oppedahl Patent Law Firm LLC

(57) ABSTRACT

The disclosure provides a method and system for realizing integrity protection. The method includes: a radio connection is reestablished between a base station and a terminal, and the base station notifies the terminal of integrity protection configuration information included in a first Radio Resource Control (RRC) connection reconfiguration signaling after the radio connection is reestablished. With the method in the disclosure, the terminal explicitly acquires the point in time of applying integrity protection, and explicitly knows a data packet to which the integrity protection is applied; furthermore, a Data Radio Bearer (DRB) integrity protection configuration is modified through the first RRC connection reconfiguration signaling after the radio connection is reestablished, thereby it is avoided that the point in time of modifying integrity protection configuration is directly introduced into the RRC signaling, thus reducing the air interface load.

7 Claims, 2 Drawing Sheets

(51) Int. Cl.
*H04W 12/10* (2009.01)
*H04W 76/02* (2009.01)
*H04W 84/04* (2009.01)

(56) References Cited

U.S. PATENT DOCUMENTS

| | | |
|---|---|---|
| 2012/0201228 A1 | 8/2012 | Wu |
| 2012/0307741 A1 | 12/2012 | Wu |
| 2013/0308539 A1 | 11/2013 | Wu |

FOREIGN PATENT DOCUMENTS

| | | | |
|---|---|---|---|
| CN | 101754243 A | | 6/2010 |
| EP | 2139292 A2 | | 12/2009 |

OTHER PUBLICATIONS

Supplementary European Search Report in European application No. 11844484.3, mailed on Dec. 18, 2013. (7 pages—see entire document).

International Search Report in international application No. PCT/CN2011/073188, mailed on Sep. 8, 2011.

English Translation of the Written Opinion of the International Search Authority in international application No. PCT/CN2011/073188, mailed on Sep. 8, 2011.

* cited by examiner

METHOD AND SYSTEM FOR REALIZING INTEGRITY PROTECTION

TECHNICAL FIELD

The disclosure relates to a mobile communication system, and in particular to a method and system for realizing integrity protection.

BACKGROUND

In order to meet the increasing demand on large bandwidth high-speed mobile access, the Third Generation Partnership Projects (3GPP) propose the standard of Long Term Evolution-Advanced (LTE-A). As to the evolution of the Long Term Evolution (LTE) system, the LTE-A keeps the core of the LTE, and expands the frequency domain and space domain by using a series of technologies to achieve the aims of improving the spectrum utilization rate and increasing the system capacity and the like.

Wireless Relay technology is one of technologies adopted in the LTE-A, aiming to extend the coverage of a cell, reduce dead zone in communications, balance load, transfer the service of hot spots, and save the transmitting power of the User Equipment (UE).

FIG. 1 is a schematic diagram illustrating the structure of an existing network using wireless relay technology, as shown in FIG. 1, some new Relay-Nodes (RNs) are added between the original base station (or referred to as Donor-eNB) and the UE, these newly-added RNs and the Donor-eNB are wirelessly connected. Wherein the radio link between the Donor-eNB and the RN is referred to as a backhaul link, and can also be represented by an interface Un; a radio link between the RN and the UE is referred to as an access link. Downlink data first reach the Donor-eNB, and then are transferred to the RN, which retransmits the downlink data to the UE, while for the uplink data, the case is opposite.

The RN has relay function of transmitting data between the RN and the Donor-eNB, as well as between the RN and the UE managed by the RN under normal working conditions. Specifically, the relay function between the Donor-eNB and the RN can include functions of obtaining system information, measuring and reporting a measuring report, switching, transmitting data by a dedicated control channel and a shared channel and the like. The RN can also manage cells under its own jurisdiction and can manage the UE in cells under normal working conditions. The relay function between the RN and the UE includes functions of sending the system information of the RN, managing the measuring process of the UE, managing the switching process of the UE, transmitting data between the RN and the UE by a control channel and a shared channel and the like.

In the backhaul link, the RN accesses the Donor-eNB as a common user equipment. The Donor-eNB configures specific parameters for the RN after a network side performs the authentication and acquires the identity of the RN, but the Donor-eNB still manages the RN like managing a common user equipment. The RN needs to comply with protocol specifications of the common user equipment in the backhaul link. When working normally, the RN provides services for multiple user equipments within its coverage, these equipments are in a connected state or an idle state. When the user equipment covered by the RN needs to transmit data, it requires transmission on Data Radio Bearer (DRB) established on the backhaul link, in order to prevent the data of the user equipment from illegal attack, the 3GPP protocol agrees to perform integrity protection on the DRB of the backhaul link. It should be noted that, before no RN is introduced into the network, only encryption algorithm, instead of integrity protection is performed on the DRB.

The existing protocol does not relate to a specific implementing method for applying the integrity protection algorithm to the DRB of the backhaul link; moreover, after the integrity protection algorithm is applied to the DRB of the backhaul link, there is a synchronization problem in the implementation process, i.e., when the established DRB which is not configured with integrity protection is reconfigured as the DRB which applies integrity protection, there is further a problem to be solved that from which data packet the integrity protection is implemented, a typical solution to the problem is to introduce a method for converting point in time, but this method needs to introduce a new point in time cell in air interface signaling, increasing the signaling overhead of the air interface.

SUMMARY

In view of the above mentioned, the disclosure mainly aims to provide a method and system for realizing integrity protection, which enables a terminal to explicitly acquire a point in time of applying integrity protection, and to explicitly know a data packet to which the integrity protection is applied, and avoids that a point in time of modifying integrity protection configuration is directly introduced into a Radio Resource Control (RRC) signaling.

In order to achieve the above object, the following technical solutions are provided.

In one aspect, a method for realizing integrity protection is provided, which includes the following steps:

a radio connection is reestablished between a base station and a terminal; and the base station notifies the terminal of integrity protection configuration information included in a first Radio Resource Control (RRC) connection reconfiguration signaling after the radio connection is reestablished.

Wherein the integrity protection configuration information may be integrity protection configuration information configured to modify a data radio bearer; and the integrity protection configuration information may include: activating an integrity protection configuration of a data radio bearer, and/or deleting an integrity protection configuration of a data radio bearer.

In the above solution, the integrity protection configuration information is activating integrity protection of one or more data radio bearers, and the method may further include:

the terminal obtains a key by which a user plane performs the integrity protection according to an integrity protection algorithm, and configures a bottom layer to apply the integrity protection algorithm and the key for the integrity protection to corresponding data radio bearers.

In the above solution, if the terminal has performed integrity protection on other data radio bearers before reestablishing the radio connection, the terminal may adopt the obtained key for integrity protection.

In the above solution, the integrity protection configuration information is deleting integrity protection of one or more data radio bearers; the method may further include:

the terminal configures the bottom layer to cancel integrity protection on corresponding data radio bearers.

In the above solution, if no data radio bearer established by the terminal needs integrity protection, the terminal may delete the obtained key by which the user plane performs the integrity protection.

In the above solution, activating the integrity protection configuration of the data radio bearer may include: setting a newly-added integrity protection enable cell as Enable or Activation; and wherein, deleting the integrity protection configuration of the data radio bearer may include: setting a newly-added integrity protection enable cell as Disable or Non-activation.

In the above solution, the terminal may be a Relay Node (RN) or a User Equipment (UE).

In another aspect, a system for realizing integrity protection is provided in the disclosure, which at least includes: a base station and a terminal, wherein, the base station is configured to reestablish a radio connection with the terminal; and notify the terminal of integrity protection configuration information included in a first RRC connection reconfiguration signaling after the radio connection is reestablished; and the terminal is configured to reestablish a radio connection with the base station, and obtain the integrity protection configuration information.

The technical solutions provided by the disclosure includes that: a radio connection is reestablished between the base station and the terminal, and the base station notifies the terminal of integrity protection configuration information included in the first RRC connection reconfiguration signaling after the radio connection is reestablished. With the method in the disclosure, the terminal explicitly acquires the point in time of applying integrity protection, and explicitly knows the data packet to which the integrity protection is applied; furthermore, the DRB integrity protection configuration is modified through the first RRC connection reconfiguration signaling after the radio connection is reestablished, thereby it is avoided that the point in time of modifying integrity protection configuration is directly introduced into the RRC signaling, thus reducing the air interface load.

DETAILED DESCRIPTION

Figure 1:
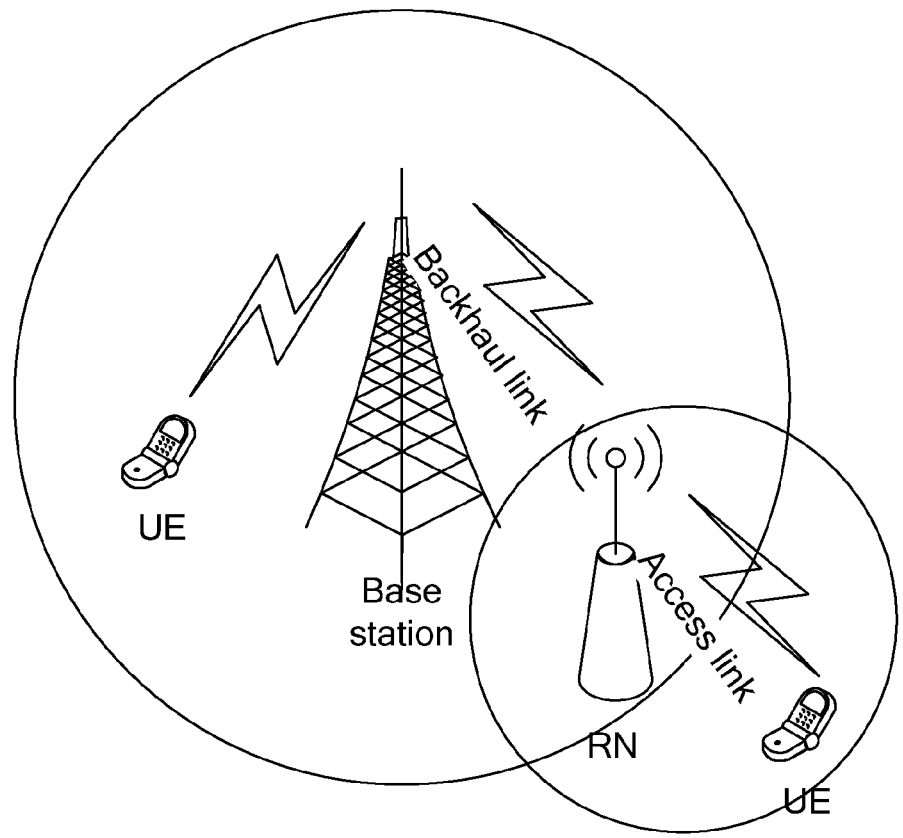
FIG. 1 is a schematic diagram illustrating the structure of an existing network using wireless relay technology.
Figure 2:
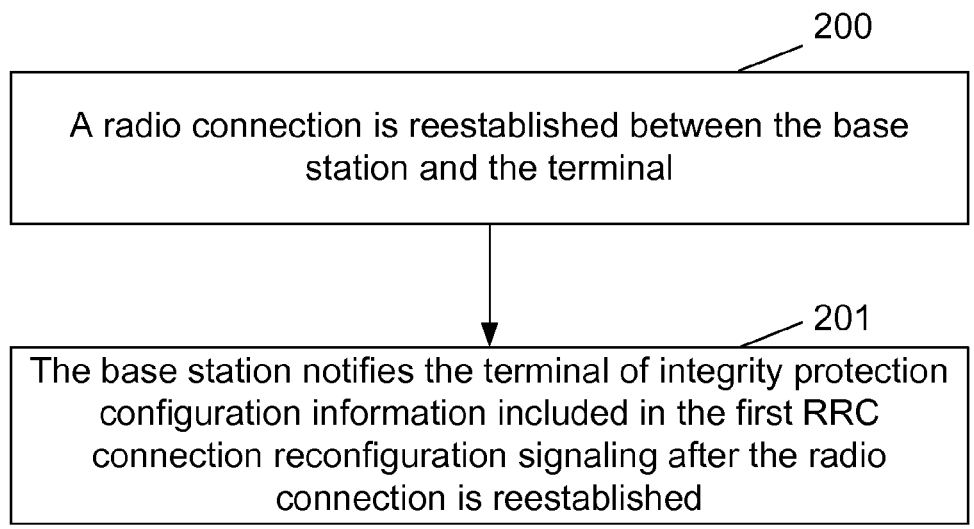
FIG. 2 is a flowchart of a method for realizing integrity protection according to the disclosure.

FIG. 2 is a flowchart of a method for realizing integrity protection according to the disclosure, as shown in FIG. 2, the method includes the following steps.

Step 200: a radio connection is reestablished between the base station (eNB) and the terminal.

The terminal may be an RN or UE. Specific implementation of the step belongs to a technology known by those skilled in the art, and will not be described here.

Step 201: the base station notifies the terminal of integrity protection configuration information included in the first RRC connection reconfiguration signaling after the radio connection is reestablished.

The integrity protection configuration information is the integrity protection configuration information configured to modify the data radio bearer, and includes: activating the integrity protection configuration of the data radio bearer; and/or deleting the integrity protection configuration of the data radio bearer.

The method of the disclosure further includes the following steps:

if the integrity protection configuration information is activating the integrity protection of one (or more) data radio bearers, then the UE or the RN obtains a key by which the user plane performs the integrity protection according to the integrity protection algorithm, and immediately configures a bottom layer to apply the integrity protection algorithm and the key for the integrity protection to the corresponding data radio bearers. Furthermore, if the UE or the RN has performed integrity protection on other data radio bearers before the radio connection is reestablished, the UE or the RN adopts the obtained key for the integrity protection.

If the integrity protection configuration information is deleting the integrity protection of one (or more) data radio bearers, the UE or the RN immediately configures a bottom layer to cancel the integrity protection on the corresponding data radio bearers. Furthermore, if no data radio bearer needs the integrity protection after the radio connection is reestablished, the UE or the RN deletes the obtained key by which the user plane performs the integrity protection.

With the method in the disclosure, the terminal explicitly acquires the point in time of applying integrity protection, and explicitly knows the data packet to which the integrity protection is applied; furthermore, the DRB integrity protection configuration is modified through the first RRC connection reconfiguration signaling after the radio connection is reestablished, thereby it is avoided that the point in time of modifying integrity protection configuration is directly introduced into the RRC signaling.

In order to implement the method of the disclosure, a system for realizing integrity protection is further provided, which at least includes a base station and a terminal, wherein the base station is configured to reestablish a radio connection with the terminal, and to notify the terminal of integrity protection configuration information included in the first RRC connection reconfiguration signaling after the radio connection is reestablished. The integrity protection configuration information is the integrity protection configuration information configured to modify the data radio bearer, and includes: activating the integrity protection configuration of the data radio bearer; and/or deleting the integrity protection configuration of the data radio bearer.

The terminal is configured to reestablish a radio connection with the base station, and to obtain the integrity protection configuration information. The terminal may be an RN or a UE.

When the integrity protection configuration information is activating the integrity protection of one (or more) data radio bearers, the terminal is further configured to obtain a key by which the user plane performs the integrity protection according to the integrity protection algorithm, and to immediately configure a bottom layer to apply the integrity protection algorithm and the key for the integrity protection to the corresponding data radio bearers. Furthermore, if the terminal has performed integrity protection on other data radio bearers before the radio connection is reestablished, the terminal is further configured to adopt the obtained key for the integrity protection.

When the integrity protection configuration information is deleting the integrity protection of one (or more) data radio bearers, the terminal immediately configures a bottom layer to cancel the integrity protection on the corresponding data radio bearers. Furthermore, if no data radio bearer needs the integrity protection after the radio connection is reestablished, the terminal is further configured to delete the obtained key by which the user plane performs the integrity protection.

Realization of the integrity protection in the cases where the terminal are respectively the RN and the UE is described in detail below in conjunction with embodiments.

In the first embodiment, assuming that the RN accesses the cell managed by the Donor-eNB, and works under normal working conditions, in the backhaul link, the Donor-eNB manages the RN like managing a common user equipment, that is, the Donor-eNB adds, modifies or deletes the configuration of the DRB for the RN, adds, modifies or deletes measuring configuration for the RN, establishes or releases Semi-Persistent Scheduling (SPS) for the RN, as well as configures the configuration of the MAC layer (MAC-Main-Config) and the configuration dedicated for the physical layer (physicalConfigDedicated) for the RN and so on. Typically, the Donor-eNB realizes these functions through RRC connection reconfiguration. The above configuration can be sent in one configuration signaling, or be sent in more configuration signalings.

In this case, assuming that the Donor-eNB configures 3 DRBs for the relay node, which are respectively DRB1, DRB2 and DRB3. In these three DRBs, DRB1 is configured to transfer signalings S1 and X2, and configured with an integrity protection algorithm; DRB2 and DRB3 are configured to transfer the data of the user equipment managed by the RN, but not configured with an integrity protection algorithm. It should be noted that the RN can obtain a key for the integrity protection algorithm through an existing mechanism, for example, a key for the integrity protection algorithm of the DRB is derived from the KeNB, the key for the integrity protection algorithm applied to an existing Signaling Radio Bearer (SRB) is also derived from the KeNB, the KeNB is obtained by the RN with an existing technology during applying the security configuration. Wherein the RN and a core network respectively compute the KeNB according to a predetermined algorithm, then an encryption key and an integrity protection key are derived from the KeNB, which can be referred to as a key root.

For the RN, it is needed to compute a Message Authentication Code for Integrity (X-MAC) of a data packet Protocol Data Unit (PDU) received on the DRB1, if the computed X-MAC is identical with the received Message Authentication Code (MAC-I) in the corresponding data packet, then it is indicated that the integrity protection is successful; otherwise, it is indicated that the integrity protection is unsuccessful. Similarly, when the RN sends the data packet to the Donor-eNB on the DRB1, it is also needed to compute the MAC-I corresponding to the data packet, then the MAC-I is sent to the Donor-eNB together with the corresponding data packet so that the Donor-eNB can verify whether the integrity protection is successful.

Figure 3:
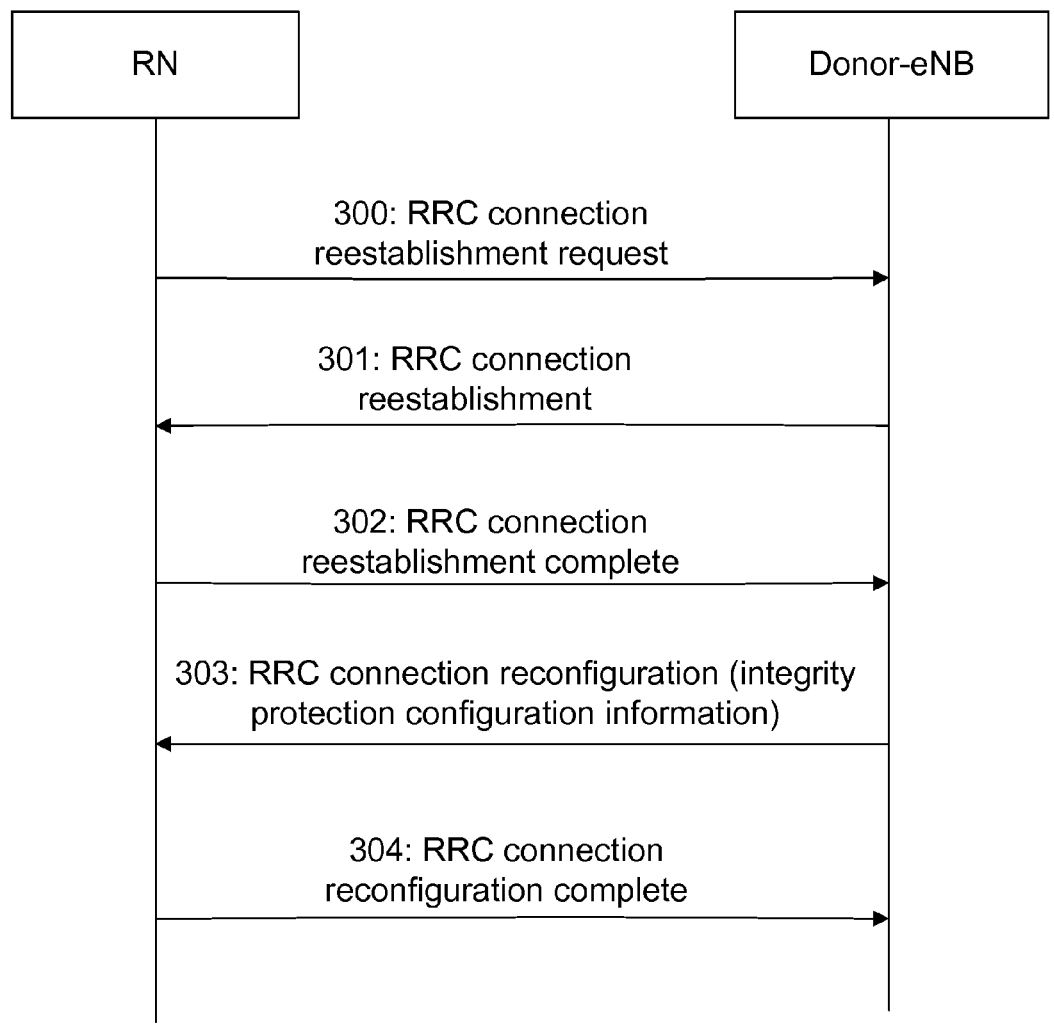
FIG. 3 is a flowchart of an embodiment of realizing integrity protection according to the disclosure.

Assuming that the RN detects an error (the error may include: the RN cannot apply the RRC connection reconfiguration sent by the Donor-eNB, or the RN detects a failure in the radio link, or the RN detects a failure in the random access etc.) in operation, the RN triggers a process of radio connection reestablishment, as shown in FIG. 3, which includes the following steps.

Step 300: the RN performs cell selection, initiates the random access in the selected cell, and sends an RRC connection reestablishment request message to the base station to which the selected cell belongs. The RRC connection reestablishment request message may include the short MAC-I computed by the RN, the Physical Cell Identifier (PCI) and the Cell Radio Network Temporary Identifier (C-RNTI) of the cell where the RN triggers the reestablishment. In the first embodiment, assuming that the RN still selects the original Donor-eNB as the reestablished base station, the RN can select any one of cells managed by the original Donor-eNB (meeting the rules of cell selection).

Step 301: after receiving the RRC connection reestablishment request message from the RN, the Donor-eNB queries a corresponding short MAC-I stored by itself according to the C-RNTI and PCI included in the RRC connection reestablishment request message, and compares the queried short MAC-I with the short MAC-I included in the RRC connection reestablishment request message to determine whether both are the same.

If the queried short MAC-I is the same as the short MAC-I included in the RRC connection reestablishment request message, the Donor-eNB accepts the RRC connection reestablishment request from the RN, and sends an RRC connection reestablishment message to the RN; if the queried short MAC-I is not the same as the short MAC-I included in the RRC connection reestablishment request message, the Donor-eNB rejects the RRC connection reestablishment request from the RN.

The Donor-eNB stores the context of the RN, by which the Donor-eNB can verify the authenticity of the RN to determine whether to accept the reestablishment request from the RN, and when determining to accept the reestablishment request from the RN, the Donor-eNB sends the RRC connection reestablishment message to the RN.

Step 302: after receiving the radio connection reestablishment message from the Donor-eNB, the RN configures a new parameter, and sends an RRC connection reestablishment complete message to the Donor-eNB. At this point, the RN completes SRB reestablishment.

Step 303: the Donor-eNB sends an RRC connection reconfiguration message to the RN, the RRC connection reconfiguration message includes DRB configuration information and measuring configuration information.

In the embodiment, assuming that the Donor-eNB modifies the configuration of the integrity protection algorithm for the DRB after reestablishment, only the DRB1 applies the integrity protection algorithm originally, but now all the DRBs configured by the Donor-eNB apply the integrity protection algorithm. The Donor-eNB, through RRC connection reconfiguration message, sets that all the DRBs need to be configured with the integrity protection algorithm activation, for example, set a newly-added cell such as an Integrity Protection Enable cell as Enable or Activation.

The Donor-eNB also needs to allocate new radio link resource for the RN through RRC connection reconfiguration message, so that the RN can recover the data radio bearer normally to transfer data, the RRC connection reconfiguration message is the first RRC connection reconfiguration message sent after the RN completes the reestablishment.

Step 304: after receiving the RRC connection reconfiguration message, the RN applies configuration parameters in the RRC connection reconfiguration message, for the DRB (i.e., DRB1, DRB2 and DRB3) configured with integrity protection enable, the RN obtains, according to the integrity protection algorithm, the key KUPint by which the user plane (i.e., DRB) performs the integrity protection, and immediately configures the bottom layer (particularly referred to as Packet Data Convergence Protocol (PDCP)) to apply the integrity protection algorithm and the key for the integrity protection. The RN needs to apply the integrity protection to all the data transmitted through these three DRBs (including sending and receiving), the integrity protection algorithm is configured by the Donor-eNB through the RRC signaling.

Then, the RN returns an RRC connection reconfiguration complete message to the Donor-eNB.

So far, the RN completes the reestablishment process, and can continue to serve the user equipment within the coverage of the RN. Through the reestablishment process, the Donor-eNB modifies the DRB integrity protection configuration established by the RN. Through the reestablishment process of the disclosure, the RN explicitly acquires the point in time of applying the integrity protection, and explicitly knows the data packet to which the integrity protection is applied; furthermore, the DRB integrity protection configuration is modified through the reestablishment process, thereby it is avoided that the point in time of modifying the integrity protection configuration is directly introduced into the RRC signaling.

In the first embodiment, the Donor-eNB newly adds two DRB integrity protection configurations in the RRC connection reconfiguration after reestablishment. In fact, this embodiment is also suitable for the case where the Donor-eNB deletes the DRB1 integrity protection configuration in the RRC connection reconfiguration after reestablishment.

The first embodiment is applied to the reestablishment process of the RN, if the DRB established by the common user equipment also needs to apply the integrity protection, the embodiment is also suitable for the common user equipment, the specific implementation is as shown in the second embodiment.

The second embodiment, assuming that the UE accesses the cell managed by the base station, and works under normal working conditions. In this case, the base station configures 3 DRBs for the UE, which are respectively DRB1, DRB2 and DRB3. Integrity protection is performed on the three DRBs respectively. It should be noted that the UE can obtain a key for the integrity protection algorithm through an existing mechanism, for example, a key for the integrity protection algorithm of the DRB is derived from the KeNB, the key for the integrity protection algorithm applied to the existing SRB is also derived from the KeNB, the KeNB is obtained by the user equipment with an existing technology during applying the security configuration.

The UE needs to compute the X-MAC of a data packet PDU received on each DRB, if the computed X-MAC is identical with the received MAC-I in the corresponding data packet, then it is indicated that the integrity protection is successful; otherwise, it is indicated that the integrity protection is unsuccessful. Similarly, when the UE sends the data packet to the base station on each DRB, it is also needed to compute the MAC-I corresponding to the data packet, then the MAC-I is sent to the base station together with the corresponding data packet so that the Donor-eNB can verify whether the integrity protection is successful.

Assuming that the UE detects an error (the error may include: the UE cannot apply the RRC connection reconfiguration sent by the base station, or the UE detects a failure in the radio link, or the UE detects a failure in the random access etc.) in operation, the UE triggers a process of radio connection reestablishment, which includes that:

firstly, the UE performs cell selection, initiates the random access in the selected cell, and sends an RRC connection reestablishment request message to the base station to which the selected cell belongs. The RRC connection reestablishment request message may include the short MAC-I computed by the UE, the PCI and C-RNTI of the cell where the RN triggers the reestablishment. In the second embodiment, assuming that the UE still selects the original base station as the reestablished base station, the UE can select any one of cells managed by the original base station (meeting the rules of cell selection). It should be noted that the UE can also select an adjacent base station as the reestablished base station, as long as the adjacent base station has the context of the UE;

next, after receiving the RRC connection reestablishment request message from the UE, the base station queries the corresponding short MAC-I stored by itself according to C-RNTI and PCI included in the RRC connection reestablishment request message, and compares the queried short MAC-I with the short MAC-I included in the RRC connection reestablishment request message to determine whether both are the same, if so, the base station accepts the RRC connection reestablishment request from the UE, and sends an RRC connection reestablishment message to the UE; if not, the base station rejects the RRC connection reestablishment request from the UE;

the base station stores the context of the UE, by which the base station can verify the authenticity (or validity) of the UE to determine whether to accept the reestablishment request from the UE, and when determining to accept the reestablishment request from the UE, the base station sends the RRC connection reestablishment message to the UE;

after receiving the radio connection reestablishment message from the base station, the UE configures a new parameter, and sends an RRC connection reestablishment complete message to the base station; at this point, the UE completes SRB reestablishment;

after that, the base station sends an RRC connection reconfiguration message to the user equipment, the RRC connection reconfiguration message includes DRB configuration information and measuring configuration information; in the embodiment, assuming that the base station modifies the configuration of the integrity protection algorithm for the DRB after reestablishment, all the DRBs apply the integrity protection algorithm originally, but now the base station deletes the integrity protection configured on all the DRBs; the base station, through RRC connection reconfiguration message, sets that no DRB needs to be configured with the integrity protection algorithm activation, for example, set Integrity Protection Enable as Disable or Non-activation;

the base station also needs to allocate new radio link resource for the UE through RRC connection reconfiguration message, so that the UE can recover the data radio bearer normally to transfer data, the RRC connection reconfiguration message is the first RRC connection reconfiguration message sent after the UE completes the reestablishment;

finally, after receiving the RRC connection reconfiguration message, the UE applies configuration parameters in the RRC connection reconfiguration message, as all the DRBs delete the integrity protection configuration, the UE immediately configures the bottom layer (particularly referred to as the PDCP layer) to apply no integrity protection algorithm and no key for the integrity protection. The UE also deletes the key for the integrity protection;

the UE returns RRC connection reconfiguration complete message to the base station;

so far, the user equipment completes the reestablishment process, and can continue to carry out services.

The above is only the preferred embodiments of the disclosure and not intended to limit the protection scope of the disclosure. Any modifications, equivalent replacements, improvements and the like within the spirit and principle of the disclosure shall fall within the protection scope of the disclosure.

The invention claimed is:

1. A method for realizing integrity protection, comprising:
reestablishing a radio connection between a base station and a terminal; and
notifying, by the base station, the terminal of integrity protection configuration information included in a first Radio Resource Control (RRC) connection reconfiguration signaling after the radio connection is reestablished,
wherein the integrity protection configuration information is configured to modify an integrity protection configuration of a data radio bearer;
the integrity protection configuration information comprises; activating the integrity protection configuration of the data radio bearer, and/or deleting the integrity protection configuration of a data radio bearer;
wherein the terminal is a Relay Node (RN);
wherein the integrity protection configuration information is deleting integrity protection of one or more data radio bearers; the method further comprising:
configuring, by the terminal, the bottom layer to cancel integrity protection on corresponding data radio bearers;
wherein, if no data radio bearer established by the terminal needs integrity protection, the terminal deletes the obtained key by which the user plane performs the integrity protection.

2. The method according to claim 1, wherein the integrity protection configuration information is activating integrity protection of one or more data radio bearers, and the method further comprising:
obtaining, by the terminal, a key by which a user plane performs the integrity protection according to an integrity protection algorithm, and configuring a bottom layer to apply the integrity protection algorithm and the key for the integrity protection to corresponding data radio bearers.

3. The method according to claim 2, wherein, if the terminal has performed integrity protection on other data radio bearers before reestablishing the radio connection, the terminal adopts the obtained key for integrity protection.

4. The method according to claim 2, wherein, activating the integrity protection configuration of the data radio bearer comprises: setting a newly-added integrity protection enable cell as Enable or Activation; and wherein, deleting the integrity protection configuration of the data radio bearer comprises: setting a newly-added integrity protection enable cell as Disable or Non-activation.

5. A system for realizing integrity protection, at least comprising: a base station and a terminal, wherein,
the base station is configured to:
reestablish a radio connection with the terminal; and
notify the terminal of integrity protection configuration information included in a first RRC connection reconfiguration signaling after the radio connection is reestablished, wherein the integrity protection configuration information is configured to modify an integrity protection configuration of a data radio bearer; the integrity protection configuration information comprises; activating the integrity protection configuration of the data radio bearer, and/or deleting the integrity protection configuration of a data radio bearer; and
the terminal is configured to reestablish a radio connection with the base station, and obtain the integrity protection configuration information,
wherein the terminal is a Relay Node (RN);
wherein, when the integrity protection configuration information is deleting integrity protection of one or more data radio bearers, the terminal is further configured to configure the bottom layer to cancel the integrity protection on corresponding data radio bearers;
wherein, the terminal is further configured to delete the obtained key by which the user plane performs the integrity protection.

6. The system according to claim 5, wherein, when the integrity protection configuration information is activating integrity protection of one or more data radio bearers, the terminal is further configured to:
obtain a key by which a user plane performs the integrity protection according to an integrity protection algorithm; and
configure immediately a bottom layer to apply the integrity protection algorithm and the key for the integrity protection to corresponding data radio bearers.

7. The system according to claim 6, wherein, if the terminal has performed integrity protection on other data radio bearers before the radio connection is reestablished, the terminal is further configured to adopt the obtained key for integrity protection.

* * * * *